(12) United States Patent
Griffin et al.

(10) Patent No.: US 8,122,719 B2
(45) Date of Patent: Feb. 28, 2012

(54) APPARATUS FOR THE COMBUSTION OF A FUEL-OXIDIZER MIX

(75) Inventors: Timothy Griffin, Ennetbaden (CH); Dieter Winkler, Lauchringen (DE)

(73) Assignee: Alstom Technology Ltd, Baden (CH)

( * ) Notice: Subject to any disclaimer, the term of this patent is extended or adjusted under 35 U.S.C. 154(b) by 867 days.

(21) Appl. No.: 12/155,397

(22) Filed: Jun. 3, 2008

(65) Prior Publication Data
US 2009/0031697 A1    Feb. 5, 2009

Related U.S. Application Data

(60) Division of application No. 11/066,926, filed on Feb. 28, 2005, now Pat. No. 7,421,844, which is a continuation of application No. PCT/CH03/00542, filed on Aug. 12, 2003.

(60) Provisional application No. 60/406,979, filed on Aug. 30, 2002.

(51) Int. Cl.
*F02C 1/00*    (2006.01)

(52) U.S. Cl. .......................... 60/723; 607/737

(58) Field of Classification Search .................... 60/723, 60/737, 738, 777, 780; 431/7, 170
See application file for complete search history.

(56) References Cited

U.S. PATENT DOCUMENTS

| | | | |
|---|---|---|---|
| 4,271,110 A | 6/1981 | Minjolle | |
| 4,298,059 A | 11/1981 | Krauth et al. | |
| 5,165,224 A | 11/1992 | Spadaccini et al. | |
| 5,207,053 A | 5/1993 | Spadaccini et al. | |
| 5,235,804 A | 8/1993 | Colket, III et al. | |
| 5,512,250 A | 4/1996 | Betta et al. | |
| 5,569,020 A | 10/1996 | Griffin et al. | |
| 5,634,784 A | 6/1997 | Pfefferle et al. | |
| 5,937,632 A | 8/1999 | Doebbeling et al. | |
| 6,358,040 B1 | 3/2002 | Pfefferle et al. | |
| 6,532,743 B1 * | 3/2003 | Fischer | 60/777 |
| 2002/0015931 A1 | 2/2002 | Smith et al. | |

FOREIGN PATENT DOCUMENTS

| | | |
|---|---|---|
| EP | 0 849 451 A2 | 6/1998 |
| FR | 1 069 211 A | 7/1954 |
| WO | WO 93/25852 | 12/1993 |
| WO | WO 03/033985 A1 | 4/2003 |
| WO | WO 2004/020905 A1 | 3/2004 |

OTHER PUBLICATIONS

International Search Report for PCT/CH03/00542, dated Nov. 5, 2003.

* cited by examiner

*Primary Examiner* — Louis Casaregola
(74) *Attorney, Agent, or Firm* — Buchanan Ingersoll & Rooney PC

(57) ABSTRACT

Apparatus for combustion of a fuel-oxidizer mixture in a combustion chamber of a turbogroup, in particular of a power plant wherein total oxidizer flow is divided into a main oxidizer flow and a secondary oxidizer flow. The main oxidizer flow is lean mixed with a main fuel flow in a premix burner, and the mixture is fully oxidized in the combustion chamber. The secondary oxidizer flow is divided into a pilot oxidizer flow and a heat-exchanging oxidizer flow. The pilot oxidizer flow is rich mixed with a pilot fuel flow, and the mixture is partially oxidized in a catalyst, with hydrogen being formed. Downstream of the catalyst, the partially oxidized pilot fuel-oxidizer mixture and the heat-exchanging oxidizer flow are together introduced into at least one zone which is suitable for stabilizing the combustion of the main fuel-oxidizer mixture.

11 Claims, 4 Drawing Sheets

APPARATUS FOR THE COMBUSTION OF A FUEL-OXIDIZER MIX

RELATED APPLICATIONS

The present application is a division of application Ser. No. 11/066,926 filed Feb. 28, 2005, which is a continuation under 35 USC §120 of International Application No. PCT/CH03/00542 filed on Aug. 12, 2003 which designated the U.S., which claims priority under 35 USC §119 to U.S. Provisional Application No. 60/406,979 filed Aug. 30, 2002, the entire contents each of which are incorporated herein by reference.

FIELD OF THE INVENTION

The present invention relates to a method and apparatus for the combustion of a fuel-oxidizer mixture in a combustion chamber of a turbogroup, in particular of a power plant.

DISCUSSION OF BACKGROUND

EP 0 849 451 A2 has disclosed a method for operating a gas turbogroup, the gas turbogroup substantially comprising a compressor, a combustor, a turbine and a generator. Air that has been compressed in the compressor and fuel are mixed in a premixer of the combustor prior to combustion and are then burnt in a combustion chamber. Compressed air supplied via a partial air pipe is mixed with fuel supplied via a partial fuel pipe, and the mixture is introduced into a reactor having a catalytic coating. In the reactor, the fuel mixture is converted into a synthesis gas, comprising hydrogen, carbon monoxide, residual air and residual fuel. This synthesis gas is injected into zones of the combustor in which it stabilizes the flame. Injecting the synthesis gas, which is highly reactive on account of the hydrogen fractions, causes flames to form at the injection locations, consuming residual oxygen from the lean main combustion. This combustion reaction is relatively stable and moreover forms an ignition source for the main combustion, and consequently the flames from this reaction also serve as pilot flames.

U.S. Pat. No. 5,569,020 has disclosed a premix burner with a lance arranged concentrically in its head. At its outlet end, this lance includes a catalyst, which is designed to carry out full oxidation of a pilot fuel-oxidizer mixture flowing through it when the premix burner is operating. This generates a hot gas flow which is mixed with the cooler main fuel-oxidizer mixture of the premix burner and thereby stabilizes the combustion of the main fuel-oxidizer mixture. Since a hot gas flow is to be generated with the aid of the lance and the catalyst arranged therein, it is to be assumed that the fully oxidized mixture in the catalyst is lean.

Modern premix burners use a lean fuel-oxidizer mixture and have to be operated close to the ignition limit of their lean mixture in order to keep the formation of $NO_x$ at a low level and in order thereby to be able to comply with the evermore stringent regulations on emissions. Consequently, these burners are very susceptible to combustion instabilities and are moreover exposed to extensive pressure fluctuations, which has an adverse effect on the service lives of the burner, of a downstream combustor and of a gas turbine and its blades and vanes. It is therefore necessary to stabilize combustion in a lean mix premix burner.

SUMMARY OF THE INVENTION

This is where the invention comes into play. The present invention deals with the problem of providing possible ways of stabilizing the combustion of a lean fuel-oxidizer mixture in a combustion chamber of a turbogroup.

The invention is based on the general concept of only partially oxidizing a rich pilot fuel-oxidizer mixture in a catalyst, in such a manner that highly reactive hydrogen is formed, with the partially oxidized, hydrogen-containing mixture together with an additional oxidizer flow being introduced into at least one zone which is suitable for stabilizing the combustion of the main fuel-oxidizer mixture. With this procedure, the oxidizer-required for the full oxidation of the partially oxidized pilot mixture is also introduced or injected into the zones which are suitable for stabilizing combustion, thereby increasing the stability of the pilot flames generated in this way. At the same time, the pilot flames, during combustion, extract no oxidizer or at least significantly less oxidizer from the main mixture, with the result that the main mixture reaction can also take place in a more stable way.

It has proven particularly expedient for stabilization of the combustion of the main mixture for the hydrogen-containing, partially oxidized pilot mixture and the additional oxidizer flow to be dimensioned so as to form a lean mixture. In particular, it may be desirable to achieve a slightly lean mixture which has only a relatively low excess of oxidizer. The influence on the emissions of the main combustion is then particularly low.

According to a particularly advantageous embodiment, the oxidizer flow which is additionally supplied and is also referred to below as a heat-exchanging oxidizer flow can be used to preheat the pilot fuel-oxidizer mixture and/or to cool the catalyst. The oxidizer used in a turbogroup generally originates from the delivery side of a compressor, so that the oxidizer, usually air, is already at a relatively high temperature. The injection of the fuel into a part-flow of the oxidizer originating from the compressor forms a pilot fuel-oxidizer mixture, the temperature of which is below the temperature of the compressed oxidizer, since the fuel, usually natural gas, is at a relatively low temperature when it is injected. Accordingly, another part-flow of the oxidizer originating from the compressor can be used to preheat the pilot fuel-oxidizer mixture by effecting suitable thermal coupling. As a result, the ignition limit of the catalytic reaction is reached after only a relatively short inlet distance into the catalyst, with the result that at the same time an increased conversion rate can be achieved in the catalyst. The catalytic reaction then increases the temperature of the catalyst. To ensure that predominantly the desired partial oxidation takes place in the catalyst, the temperature in the catalyst must not rise excessively, since otherwise full oxidation can take place and/or a homogeneous gas reaction may occur. The heat-exchanging oxidizer flow is especially suitable for cooling the catalyst, in particular after it has released heat to the pilot fuel-oxidizer mixture. This allows the desired partial oxidation reaction in the catalyst to be stabilized.

According to a preferred embodiment, the catalyst may have a plurality of channels through which medium can flow in parallel and of which some are catalytically active and the others are catalytically inactive. The catalytically active channels in this case form a catalytically active path through the catalyst which is configured in such a way that, as the rich pilot fuel-oxidizer mixture flows through it, it allows the desired partial oxidation with hydrogen being formed. The catalytically inactive channels form a catalytically inactive path through the catalyst, and the heat-exchanging oxidizer flow flows through this catalytically inactive path in operation. The channels are coupled to one another in such a manner as to exchange heat on account of the channels being of uniform design, i.e. the channels being accommodated in a common structure of the catalyst. This design therefore on the one hand allows the pilot fuel-oxidizer mixture which has been introduced into the catalyst to be preheated and on the other hand allows the catalyst to be cooled. Suitable matching of the catalytically active channels and the catalytically inactive channels, in particular in terms of their number, arrangement and dimensions, makes it possible to achieve a targeted heat management for the catalyst which is designed for an rated operating state of the apparatus, in particular of the turbogroup. This allows the catalyst to have a long service life and also allows reproducible combustion reactions to be established in the catalyst and therefore in the stabilization zones.

Further important features and advantages of the present invention will emerge from the subclaims, from the drawings and from the associated description of figures with reference to the drawings.

BRIEF DESCRIPTION OF THE DRAWINGS

Preferred exemplary embodiments of the invention are illustrated in the drawings and are explained in more detail in the description which follows, in which identical designations relate to identical or similar or functionally equivalent components. In the drawings, in each case schematically.

WAYS OF CARRYING OUT THE INVENTION

Figure 1:
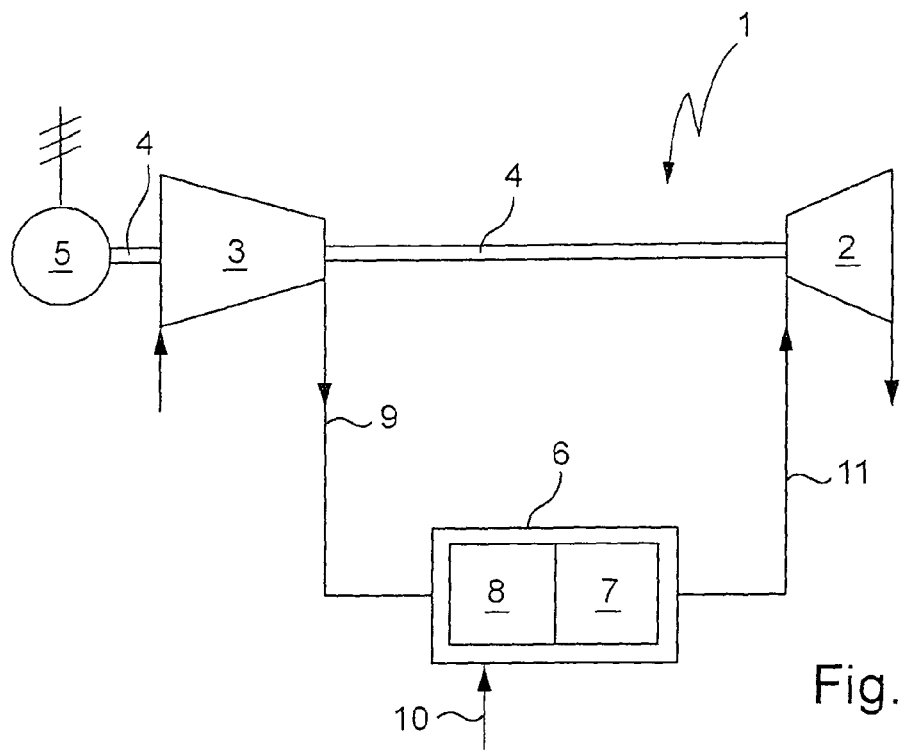
FIG. 1 shows an outline illustration, in circuit diagram form, of a turbogroup equipped with an apparatus according to the invention.

In accordance with FIG. 1, a turbogroup 1 comprises a turbine 2, which is designed in particular as a gas turbine, and a compressor 3, which is connected to the turbine 2 via a drive shaft 4. It is customary for the turbogroup 1 to be used in a power plant, in which case the turbine 2 additionally drives a generator 5 via the shaft 4.

Moreover, the turbogroup 1 comprises a combustion system, referred to as combustor 6, which has at least one combustion chamber 7 and at least one premix burner 8 connected upstream of this combustion chamber 7. On the entrance side, the combustor 6 is connected to the high-pressure side of the compressor 3, and on the exit side it is connected to the high-pressure side of the turbine 2. Accordingly, the combustor 6 is supplied with oxidizer, in particular air, via an oxidizer pipe 9 from the compressor 3.

The fuel supply is effected via a corresponding fuel pipe 10. The hot combustion gases are fed to the turbine 2 via a hot gas pipe 11. The combustor 6 is used for combustion of a fuel-oxidizer mixture in the combustion chamber 7; the combustor 6 therefore forms an apparatus according to the invention. This apparatus is therefore also referred to below by reference numeral 6.

Figure 2:
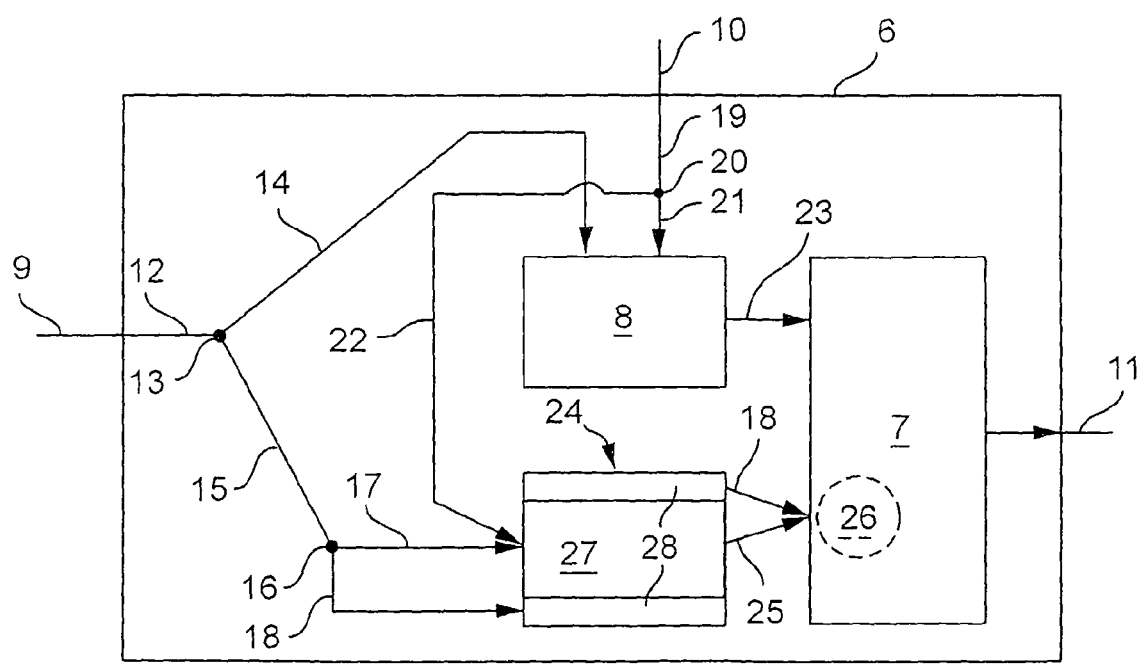
FIG. 2 shows an outline illustration, in circuit diagram form, of an apparatus according to the invention.

FIG. 2 shows a detail view of the combustor 6 or the apparatus 6. Accordingly, by suitable flow guidance a total oxidizer flow 12 from the compressor 3 is divided at 13 into a main oxidizer flow 14 and a secondary oxidizer flow 15. Then, at 16, the secondary oxidizer flow 15 is divided into a pilot oxidizer flow 17 and a heat-exchanging oxidizer flow 18. In this case, a total fuel flow 19 is also divided in a corresponding way, at 20, into a main fuel flow 21 and a pilot fuel flow 22. The division of the oxidizer flows can take place, for example, in a plenum of the combustor 6, so that the branching points 13 and 16 coincide. A suitable valve or the like may be arranged in particular at the branching point 20 of the fuel flow. It is also possible for the pilot fuel flow 22 to be provided with a dedicated pump and to be fed to the combustor 6 in particular independently of the main fuel flow 21.

As can be seen from the circuit diagram presented in FIG. 2, the main oxidizer flow 14 and the main fuel flow 21 are fed to the premix burner 8, with the result that a main fuel-oxidizer mixture 23 is formed in the premix burner 8. This main fuel-oxidizer mixture 23 is then introduced into the combustion chamber 7, in which it is burnt with full oxidizer. It is expedient for the fuel and oxidizer to be fed into the premix burner 8 in such a way as to produce a lean main mixture 23.

Moreover, the apparatus 6 or combustion chamber 6 is equipped with a catalyst 24, the catalytic material of which is selected in such a way that under defined boundary conditions it effects partial oxidation of a fuel-oxidizer mixture which is supplied, in such a manner that hydrogen is formed during this partial oxidation. A mixture made up of the pilot oxidizer flow 17 and the pilot fuel flow 22 is fed to the catalyst 24. The pilot fuel flow 22 is admixed to the pilot oxidizer flow 17 in such a way that a rich pilot fuel-oxidizer mixture 17, 22 is formed. The mixture formation may—as in this case—take place in an inlet region of the catalyst 24; it is also possible for the pilot fuel-oxidizer mixture 17, 22 already to have been formed upstream of the catalyst 24. The synthesis gas which forms in the catalyst 24 as a result of partial oxidation is also referred to below as partially oxidized pilot fuel-oxidizer mixture which is introduced, for example, into the combustion chamber 7 as indicated by arrow 25. Further reaction products in the case of a natural gas/air mixture are, in addition to hydrogen, mainly carbon monoxide and residual air and/or residual natural gas.

Then, according to the invention, the partially oxidized pilot fuel-oxidizer mixture 25 is introduced into the combustion chamber 7 together with the heat-exchanging oxidizer flow 18. As a result, a very stable pilot flame or pilot combustion can be generated at the respective location of introduction. The heat-exchanging oxidizer flow 18 and the volumetric flow of the partially oxidized pilot mixture 25 are expediently adapted to one another in such a way that a lean or at least slightly lean mixture is formed when they are mixed.

To allow the main combustion in the combustion chamber 7 to be stabilized with the aid of the stable pilot flames, the partially oxidized pilot mixture 25 and the heat-exchanging oxidizer flow 18 are introduced or injected into one or more zones 26, one of which is symbolically indicated by a dashed line in FIG. 2. These zones 26 are selected in such a way as to be particularly suitable for stabilizing the main combustion of the main fuel-oxidizer mixture 23 that is formed in the premix burner 8. Zones 26 of this type are predominantly located within the combustion chamber 7. It is also possible for at least one such zone 26 to be located in the premix burner 8, so that in addition or as an alternative the partially oxidized pilot mixture 25 together with the heat-exchanging oxidizer flow 18 are introduced into the premix burner 8 at a corresponding location, as is realized, for example, in the embodiments shown in FIGS. 3 and 4. Zones 26 which are suitable for stabilization of the main combustion of the main mixture 23 in the combustion chamber 7 may, for example, be: a central recirculation zone in the combustion chamber 7, an outer recirculation or dead water zone and a portion of the premix burner 8 which is remote from the combustion chamber 7. The abovementioned recirculation zones are formed if the premix burner 8 merges into the combustion chamber 7 via a sudden cross-sectional widening, and as a result a swirling flow of the premix burner 8 breaks down at the transition into the combustion chamber 7, a phenomenon known as vortex breakdown.

In the specific embodiment shown here, the catalyst 24 has a catalytically active path 27 and a catalytically inactive path 28, which is coupled to the catalytically active path 27 so as to exchange heat. Whereas the pilot fuel-oxidizer mixture 17, 22 is introduced into the catalytically active path 27, the catalytically inactive path 28 has the heat-exchanging oxidizer flow 18 flowing through it. As a result, the heat-exchanging oxidizer flow 18 can be used firstly to preheat the pilot mixture 17, 22, the temperature of which has been reduced by the addition of the relatively cold pilot fuel flow 22. The preheating advantageously shifts the ignition of the catalyst reaction toward the inlet end of the catalyst 24. Secondly, the flow of the heat-exchanging oxidizer flow 18 through the catalytically inactive path 28 effects cooling of the catalyst 24, so that the catalyst 24 can be operated in a predetermined temperature window which is particularly suitable for the desired catalytic reaction. The cooling of the catalyst 24 in particular avoids full oxidation of the pilot mixture 17, 22 and the formation of a homogeneous gas reaction in the pilot mixture 17, 22 within the catalyst 24.

It will be clear that in addition to partial oxidation full oxidation of the pilot mixture 17, 22 may also take place in the catalyst 24 or in its catalytically active path 27. Furthermore, at relatively low temperatures and with natural gas used as fuel, endothermic steam reforming may take place in the catalyst 24, which can improve the production of hydrogen and, for example, carbon monoxide. Furthermore, it is possible to feed steam to the catalyst 24 and/or the pilot mixture 17, 22.

The means which are used to supply the heat-exchanging oxidizer flow 18 in this case form an oxidizer supply device, with the catalytically inactive path 28 of the catalyst 24 in this case forming part of this oxidizer supply device.

Figure 3:
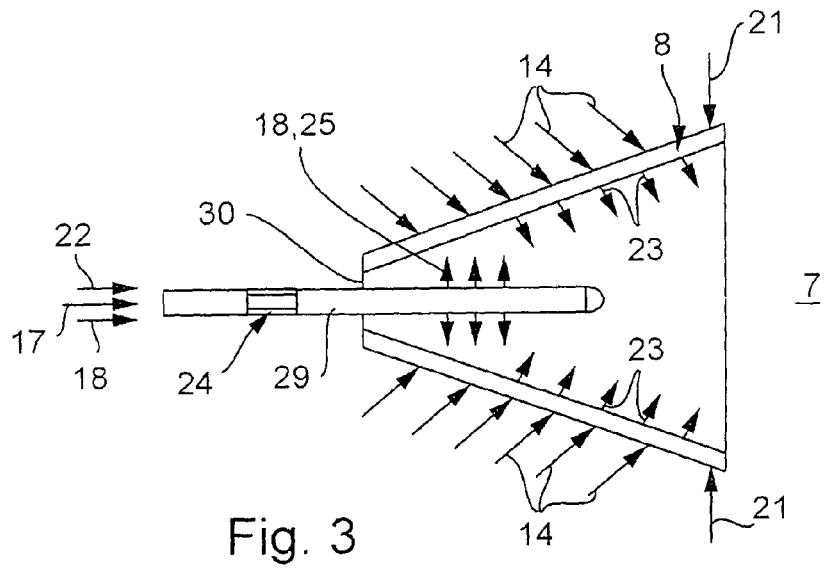
FIG. 3 shows an outline illustration, in the form of a longitudinal section through a premix burner.
Figure 4:
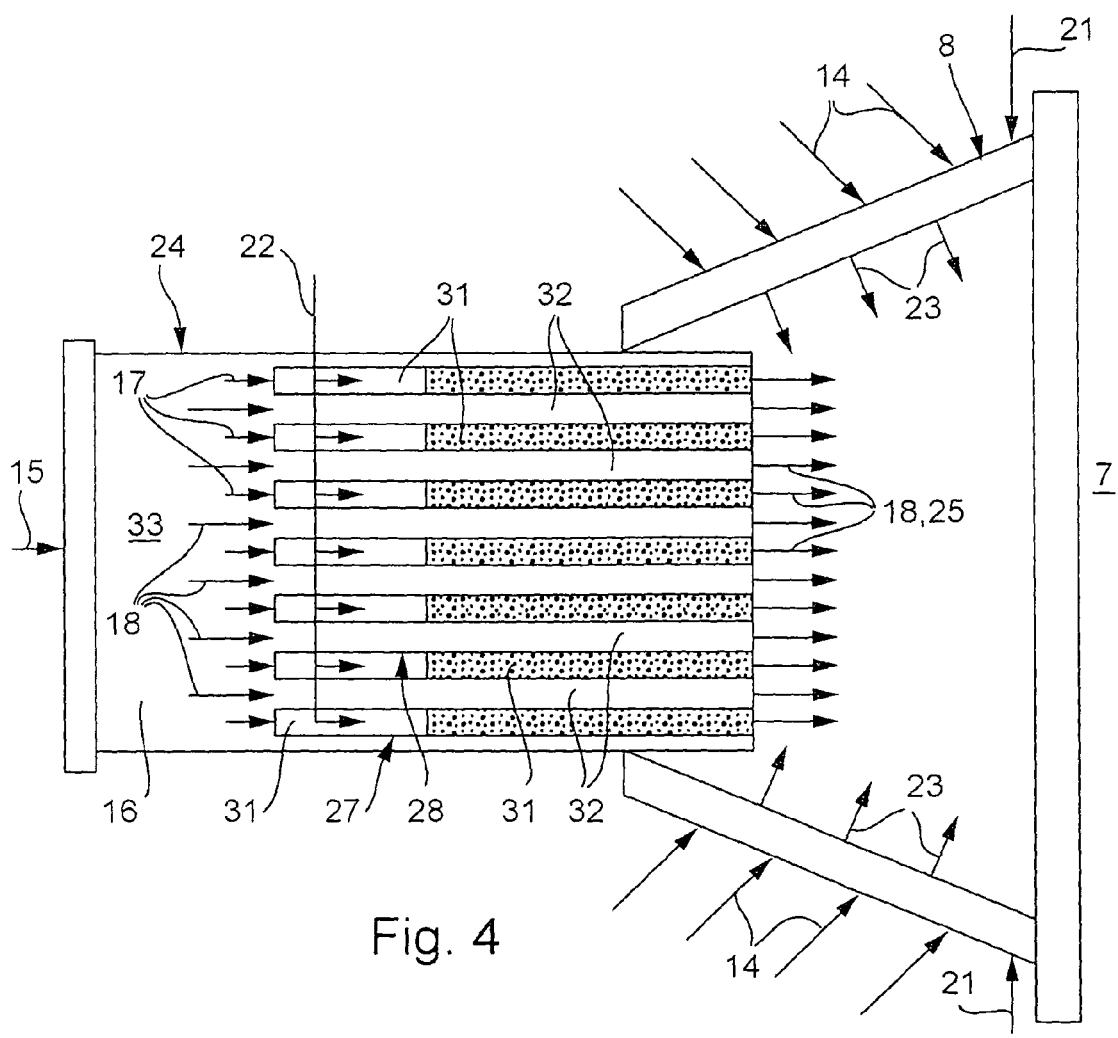
FIG. 4 shows a similar view to FIG. 3, but for a different embodiment.

In accordance with FIGS. 3 and 4, in preferred embodiments the catalyst 24 may be integrated in the premix burner 8. In accordance with FIG. 3, for example, the catalyst 24 may be installed in a lance 29, which is arranged centrally at a head 30, which is remote from the combustion chamber 7, of the burner 8, where it projects into the premix burner 8 in the direction of the combustion chamber 7. The reactive, partially oxidized pilot mixture 25 is in this case injected into the premix burner 8 together with the heat-exchanging oxidizer flow 18 at the head 30. In the embodiment shown in FIG. 4, the catalyst 24 itself is arranged centrally in the head 30 of the premix burner 8.

The text which follows explains a specific embodiment of the catalyst 24 with reference to FIG. 4, without the installation situation of the catalyst 24 shown in FIG. 4 being of particular importance. The catalyst 24 may have a plurality of channels 31 and 32 through which medium can flow in parallel and of which some are catalytically active channels 31 while the others are catalytically inactive channels 32. The catalytically active channels 31 in this case form the catalytically active path 27 of the catalyst 24, while the catalytically inactive channels 32 form the catalytically inactive path 28 of the catalyst 24. Upstream of the inlet openings of the individual channels 31, 32, the catalyst 4 has a distribution chamber 33, which corresponds to the branching point 16 in FIG. 2. Accordingly, the secondary oxidizer flow 15 which is supplied is distributed in the distribution chamber 33 between the catalytically active channels 31 (pilot oxidizer flow 17) and the catalytically inactive channels 32 (heat-exchanging oxidizer flow 18). In the embodiment shown here, the pilot fuel flow 22 is admixed within the catalytically active channels 31, expediently upstream of a catalytic coating of the catalytically active channels 31. To effect intensive cooling of the catalytically active channels 31, firstly the catalytically active channels 31 and the catalytically inactive channels 32 are arranged so as to alternate with one another. Secondly, the catalytically active channels 31 are coupled to the catalytically inactive channels 32 in such a manner as to exchange heat, which can be realized in particular by means of common boundary walls.

Figure 5:
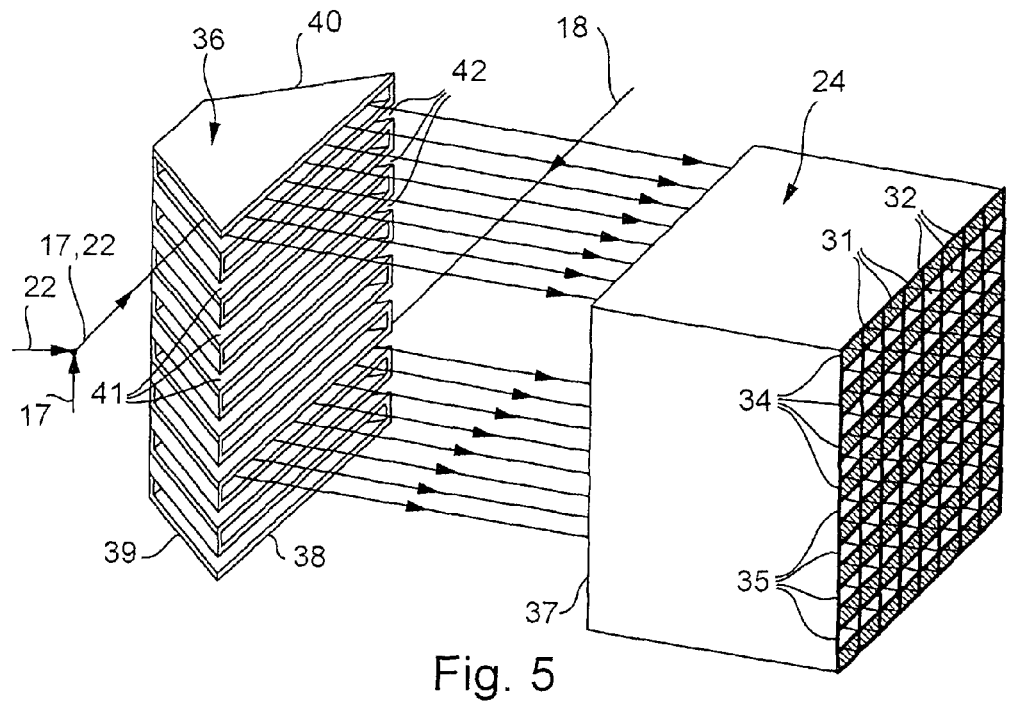
FIG. 5 shows an exploded, perspective illustration of a catalyst and a distribution head.

In accordance with FIG. 5, the individual channels 31, 32 of the catalyst 24 may be formed as catalytically active and catalytically inactive lines arranged alternately with one another in the form of alternating lines. Accordingly, in FIG. 5 lines 34 which comprise catalytically active channels 31 arranged next to one another alternate with lines 35 which comprise catalytically inactive channels 32 arranged next to one another. This results in an alternating layered arrangement of the lines 34, 35 transversely with respect to the main through flow direction of the catalyst 24. To separate the introduction of the heat-exchanging oxidizer flow 18 into the catalytically inactive channels 32 from the supply of the pilot mixture 17, 22 composed of pilot fuel flow 22 and pilot oxidation flow 17 into the catalytically active channels 31, a distribution head 36 is connected upstream of the catalyst 24. This distribution head 36 has an exit 38 connected to an entrance 37 of the catalyst 24. Furthermore, the distribution head 36 has a first entrance 39, which faces the viewer in FIG. 5, and a second entrance 40, which faces away from the viewer in FIG. 5. The first entrance 39 is connected to a pilot fuel-oxidizer mixture pipe (not shown), which feeds the pilot mixture 17, 22 to the first entrance 39. In a corresponding way, a heat-exchanging oxidizer pip (not shown), which forms part of the abovementioned oxidizer supply device and by means of which the heat-exchanging oxidizer flow 18 is fed to the second entrance 40, is connected to the second entrance 40.

The distribution head 36 is composed of a plurality of shafts 41 and 42 which are adjacent transversely with respect to the main through flow direction of the catalyst 24. All the shafts 41, 42 are opened toward the exit 38 of the distribution head 36. Moreover, the first shafts 41, which are assigned to the first entrance 39, are open toward the first entrance 39 and closed toward the second entrance 40. In a corresponding way, the second shafts 42, assigned to the second entrance 40, are opened toward the second entrance 40 and closed toward the first entrance 39. The dimensions of the shafts 41, 42 are matched to the dimensions of the channels 31, 32 of the catalyst 40 in such a way that each shaft exit covers one line 34, 35. Since the first shafts 41 and the second shafts 42 are arranged alternately next to one another, this results in the desired distribution of the flows which are fed to the distribution head 36, namely pilot mixture 17, 22, on the one hand, and heat-exchanging oxidizer flow 18, on the other hand, between the individual lines 34, 35, of the catalyst 24.

Figure 6:
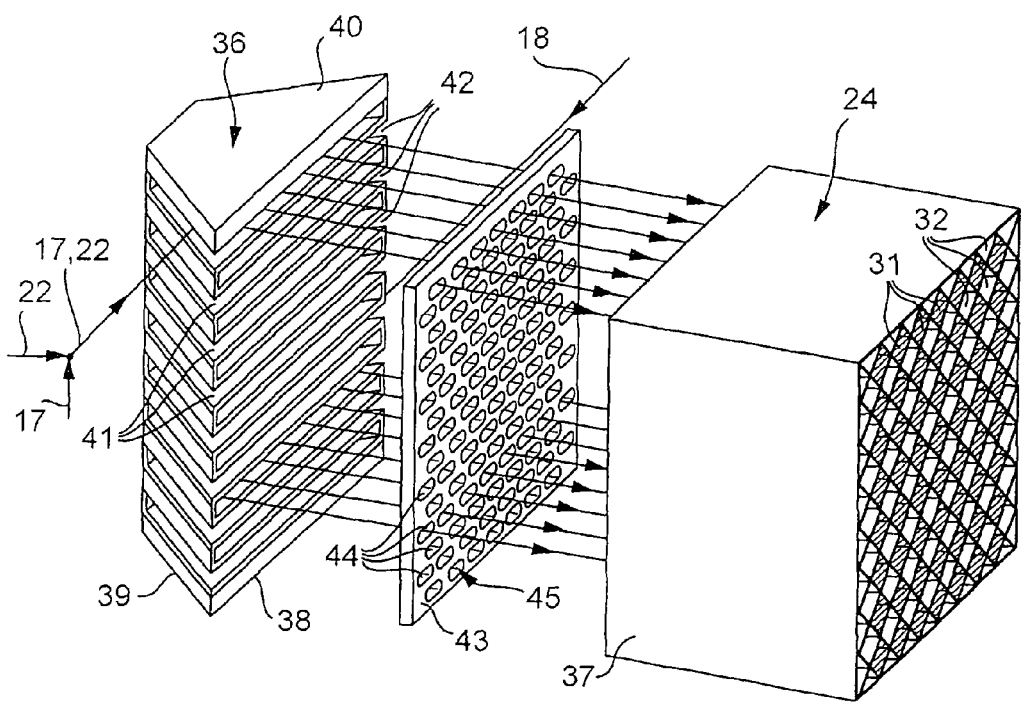
FIG. 6 shows an illustration similar to FIG. 5, but additionally having a plate with holes.

In the embodiment shown in FIG. 6, the distribution head 36 is of fundamentally the same structure as in the embodiment shown in FIG. 5. However, a difference is that in the catalyst 24 the catalytically active channels 31 and the catalytically inactive channels 32 in FIG. 6 are no longer arranged in lines as in FIG. 5, but rather are in a chessboard pattern. This chessboard arrangement is rotated through 45° about the main through flow direction of the catalyst 24 with respect to a rectangular cross section of the catalyst 24, resulting, as it were, in a diagonal chessboard-like arrangement of the channels 31, 32. To allow a clear separation to be effected between the pilot mixture 17, 22 and the heat-exchanging oxidizer flow 18 for flow through the catalyst 24 in this embodiment too, a plate with holes 43, which has a multiplicity of through holes 44 arranged in a predetermined hole pattern 45, is arranged between the entrance 37 of the catalyst 24 and the exit 38 of the distribution head 36. This hole pattern 45 is expediently selected in such a way that each channel 31, 32 is only in communication with one of the shafts 41, 42 via a single through hole 44. This means that the holes 44 are in each case only open toward a single shaft 41, 42 on one side and toward a single channel 31, 32 or a single group of channels composed of catalytically active channels 31 or catalytically inactive channels 32 on the other side. The result of this is that on the one hand the pilot mixture 17, 22 which flows into the first shafts 41 passes only into catalytically active channels 31, while on the other hand the heat-exchanging oxidizer flow 18 flows only into catalytically inactive channels 32 via the second shafts 42.

The specific measures of the embodiments shown in FIGS. 5 and 6 make it possible in a particular simple way to produce the pilot fuel-oxidizer mixture 17, 22 in a relatively simple way before it is introduced into the catalyst 24 or into the passages 31, 32 thereof.

Figure 7A:
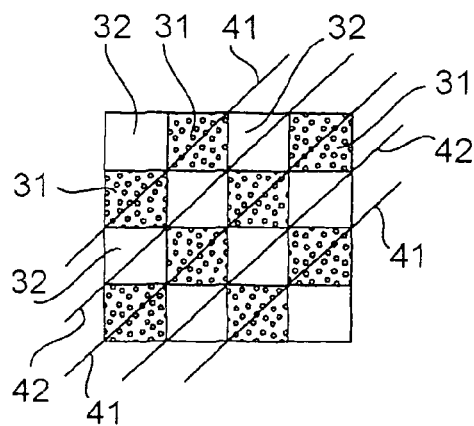
FIG. 7a to 7d show greatly simplified excerpts from a cross section through a catalyst for various embodiments.

FIG. 7a illustrates an excerpt from the cross section through the catalyst 24 as shown in FIG. 6. Accordingly, the catalytically active channels 31 and the catalytically inactive channels 32 are arranged in such a way as to alternate in a chessboard pattern. The lines indicated in FIG. 7a represent the orientations or longitudinal center planes of the shafts 41 or 42 assigned to the respective channels 31, 32 at their outlet.

Figure 7B:
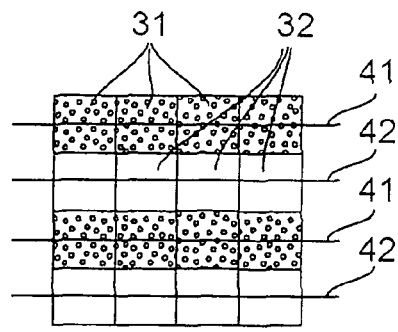

FIG. 7b shows an arrangement of the catalytically active channels 31 and the catalytically inactive channels 32 in alternating lines, corresponding to the embodiment of the catalyst 24 illustrated in FIG. 5, but otherwise corresponds to the illustration presented in FIG. 7a.

Figure 7C:
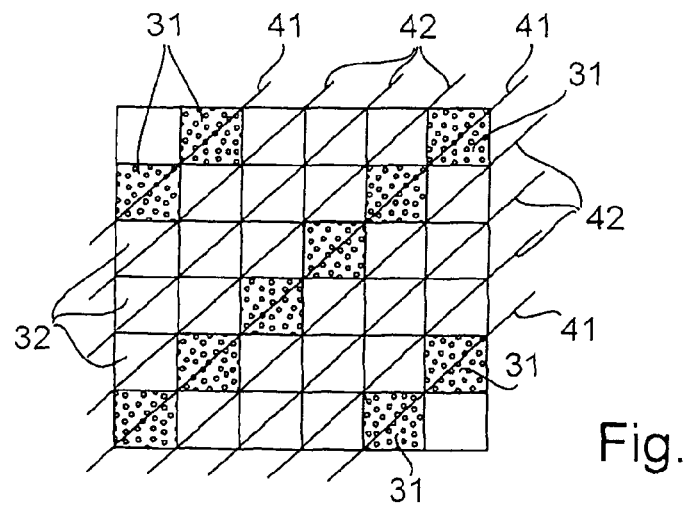

FIG. 7c shows another advantageous arrangement for the catalytically active channels 31 and the catalytically inactive channels 32. In this variant, the number of catalytically inactive channels 32 and the proportion of the total cross-sectional area of the catalyst 24 which they form are greater than for the catalytically active channels 31. In this case, the heat-exchanging oxidizer flow 18 and/or the pilot mixture 17, 22 are supplied via a corresponding arrangement of the first shafts 41 and second shafts 42 in the distribution head 36.

Figure 7D:
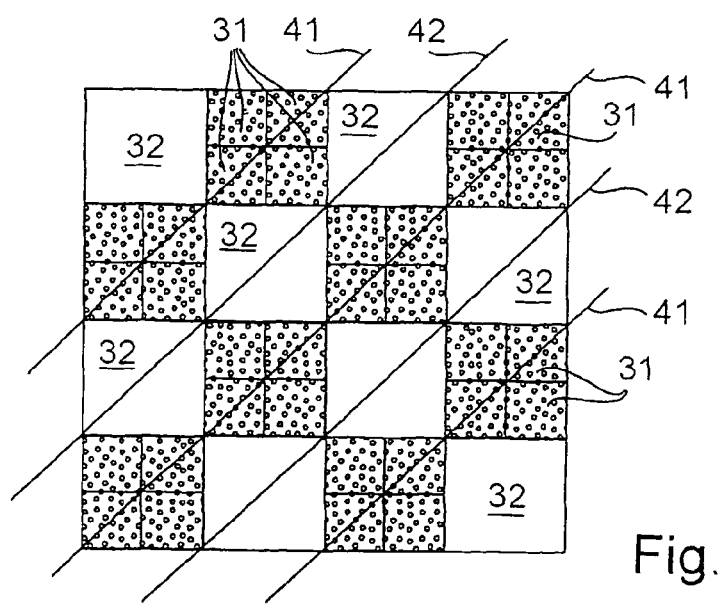

In the embodiment shown in FIG. 7d, the catalytically active channels 31 and the catalytically inactive channels 32 are once again arranged in a chessboard pattern, with the catalytically active channels 31 in each case combined to form groups of four. Accordingly, the result is a significantly greater number of catalytically active channels 31, whereas the proportion of the total surface area of the catalyst 24 through which medium can flow which is made up of the catalytically active channels 31 is approximately equal to the proportion made up of the catalytically inactive channels 32. In this embodiment, the individual holes 44 of the plate with holes 43 are then assigned either to a single catalytically inactive channel 32 or to a group of four catalytically active channels 31. This embodiment greatly increases the catalytically active surface area and also increases the flow resistance within the catalytically active path 27, with the result that the overall conversion rate which can be achieved within the catalytic reaction can be improved.

For further variants and embodiments of a catalyst arrangement of this type, moreover, reference is made to WO 03/033985 A1, the content of which is hereby incorporated by express reference in the content of disclosure of the present invention. WO 03/033985 A1 has disclosed a method and a device for supplying and discharging two gases to and from a multichannel monolith structure. A first gas and a second gas can be fed separately to first and second channels of the monolith structure with the aid of a distribution head. Within the monolith structure, the channels are arranged in such a way that each first channel has a common separation wall with at least one second channel, via which separation wall mass and/or heat transfer between the channels is possible.

The invention claimed is:

1. An apparatus for the combustion of a fuel-oxidizer mixture in a combustion chamber of a turbogroup, in particular a power plant, comprising:
a premix burner, in which, when the apparatus is operating, a main oxidizer flow is lean mixed with a main fuel flow and this main fuel-oxidizer mixture is fully oxidized;
at least one catalyst, which is designed, when the apparatus is operating, to partially oxidize a rich pilot fuel-oxidizer mixture flowing through it so as to form hydrogen, the at least one catalyst including a heat exchanger;
an oxidizer supply device which, when the apparatus is operating, admixes a heat-exchanging oxidizer flow to the partially oxidized pilot fuel-oxidizer mixture downstream of the catalyst, the heat-exchanging oxidizer flow exchanges heat with the rich pilot fuel-oxidizer mixture, in the heat exchanger;
wherein the catalyst and the oxidizer supply device being designed in such a way that, when the apparatus is operating, they introduce the partially oxidized pilot fuel-oxidizer mixture and the heat-exchanging oxidizer flow together into at least one zone that is suitable for stabilizing the combustion of the main fuel-oxidizer mixture.

2. The apparatus as claimed in claim 1, wherein
the catalyst has a catalytically active path through which medium can flow and a catalytically inactive path through which medium can flow in parallel with the catalytically active path,
the catalytically active path is designed to partially oxidize a rich pilot fuel oxidizer mixture flowing through it, with hydrogen being formed, in that the catalytically inactive path is coupled to the catalytically active path in such a manner as to exchange heat, forms part of the oxidizer supply device and has the heat-exchanging oxidizer flow flowing through it when the apparatus is operating.

3. The apparatus as claimed in claim 2, wherein the catalyst has a plurality of channels, through which medium can flow in parallel and of which some are catalytically active and the others are catalytically inactive, in that the catalytically active path of the catalyst is formed by its catalytically active channels, in that the catalytically inactive path of the catalyst is formed by its catalytically inactive channels.

4. The apparatus as claimed in claim 3, wherein a pilot fuel pipe is connected to the catalytically active channels, in such a manner that, when the apparatus is operating, it introduces the pilot fuel flow separately into the individual catalytically active channels.

5. The apparatus as claimed in claim 2, wherein
a pilot oxidizer pipe is connected to the catalytically active path,
a pilot fuel pipe is connected to the pilot oxidizer pipe upstream of the catalyst.

6. The apparatus as claimed in claim 1, wherein the catalyst is arranged concentrically in a head of the premix burner.

7. The apparatus as claimed claim 1, wherein the catalyst is arranged in a lance which is arranged concentrically in a head of the premix burner and projects into the premix burner.

8. The apparatus as claimed claim 1, wherein a distribution head is positioned upstream of the catalyst, a first entrance of which the distribution head is connected to a pilot fuel-oxidizer mixture pipe, a second entrance of which the distribution head is connected to a heat-exchanging oxidizer pipe and an exit of which the distribution head is connected to the catalyst, the distribution head has a plurality of shafts which are adjacent transversely with respect to the direction of flow and are all open at the exit and are selectively open at the first entrance or at the second entrance.

9. The apparatus as claimed in claim 3, wherein the catalytically active channels and the catalytically inactive channels are distributed in such a way that first lines of catalytically active channels arranged next to one another and second lines of catalytically inactive channels arranged next to one another are arranged alternately with one another, in particular in alternate lines, first shafts, which are open toward the first entrance, adjoin the first lines and second shafts, which are open toward the second entrance, adjoin the second lines.

10. The apparatus as claimed in claim 9, wherein a plate with holes, of which the hole pattern is selected in such a way that each channel is in communication with one of the shafts through a single through hole, is arranged between the distribution head and the catalyst.

11. The apparatus as claimed in claim 10, wherein the catalytically active channels and the catalytically inactive channels are arranged alternately in a chessboard pattern, the hole pattern of the plate with holes and the arrangement of the channels are adapted to one another in such a way that the catalytically active channels are in communication with the first shafts, which lead to the first entrance of the distribution head, via the associated through holes, whereas the catalytically inactive channels are in communication with the second shafts, which lead to the second entrance of the distribution head, via the associated through holes.

* * * * *